United States Patent Office 3,509,191
Patented Apr. 28, 1970

3,509,191
SILACYCLOPENTENES AND A METHOD
FOR MAKING SAME
William H. Atwell, Midland, Mich., assignor to Dow
Corning Corporation, Midland, Mich., a corporation of
Michigan
No Drawing. Filed Apr. 29, 1968, Ser. No. 725,166
Int. Cl. C07d 103/02; C07f 7/08; C07l 7/18
U.S. Cl. 260—448.2
14 Claims

ABSTRACT OF THE DISCLOSURE

A method for making certain silacyclopentenes by heating certain disilanes with butadienes to a temperature from 50° C. to 600° C. and thereafter recovering the silacyclopentene. Illustrative of the method is the following:

$(CH_3)_2Si_2Cl_4 + H_2C=CCH_3-CCH_3=CH_2 \xrightarrow{\Delta}$ 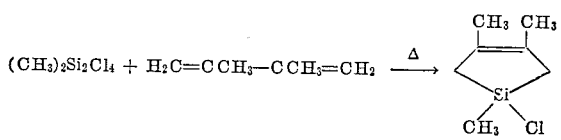

The silacyclopentenes which are described herein are particularly useful as crosslinkers and chain extenders for certain polymer systems.

This invention relates to novel silacyclopentenes and particularly to silacyclopentenes which contain a functional group (i.e., an alkoxy radical or a halogen atom) attached to the silicon atom.

The silacyclopentenes defined herein can be utilized as crosslinkers and chain extenders for certain polymer systems. As a means of illustration, the silacyclopentenes could be used to replace vinyl silanes to crosslink a variety of catalyzed silicon-hydride additions in numerous polymer and/or elastomer systems.

This invention relates to a method for making silacyclopentenes comprising (A) heating to a temperature of from 50° C. to 600° C.,
(1) a disilane of the formula
R′$_{6-n}$Si$_2$X$_n$, which
R′ is selected from the group consisting of methyl radicals, alkoxy radicals, and halogen atoms selected from the group consisting of a chlorine atom, a bromine atom, an iodine atom, and a fluorine atom,
X is selected from the group consisting of an alkoxy radical and a halogen atom selected from the group consisting of a chlorine atom, a bromine atom, an iodine atom, and a fluorine atom,
n has a value of from 1 to 6 inclusive, with
(2) a butadiene of the formula
H$_2$C=CR—CR=CH$_2$, in which
R is selected from the group consisting of hydrogen atoms and alkyl radicals containing from 1 to 6 carbon atoms inclusive, thereafter
(B) recovering silacyclopentenes of the formulae

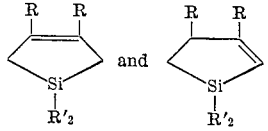

in which R and R′ are as above defined.

As noted above, R can be a hydrogen atom or an alkyl radical containing from 1 to 6 carbon atoms inclusive such as the methyl, ethyl, propyl, isopropyl, butyl, isobutyl, t-butyl, amyl, and the hexyl radical.

R′ and X can be alkoxy radicals such as the methoxy, ethoxy, propoxy, isopropoxy, butoxy, isobutoxy, amyloxy, and the hexoxy radical. R′ and X can also be a halogen atom, i.e., chlorine, bromine, iodine and fluorine.

The reaction may be conveniently carried out at a temperature from 50° C. to 600° C., (preferably within the range from 400° C. to 550° C.) by passing the two reactants continuously through a hot tube at atmospheric pressure. Alternatively, the reactions can be carried out in a closed system, and if a closed system is employed, longer contact times are achieved and the temperature may be lowered, i.e., to 150° C. to 200° C. When X is an alkoxy radical and to 300° C. to 350° C. when X is a halogen atom. However, under the latter conditions the butadiene tends to undergo side reactions thereby decreasing the yields of the desired silacyclopentene.

It is preferred that at least one mol of butadiene (2) per mol of disilane (1) be employed since smaller amounts of the butadiene leads to decreased yields of the desired silacyclopentenes.

This invention also relates to silacyclopentenes of the formula

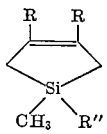

in which R is selected from the group consisting of hydrogen atoms and alkyl radicals containing from 1 to 6 carbon atoms inclusive, and
R″ is a halogen atom selected from the group consisting of a chlorine atom, a bromine atom, an iodine atom, and a fluorine atom.

In the formula illustrated above, it is preferred that R be a hydrogen atom and R″ be a chlorine atom or a fluorine atom.

The silacyclopentenes noted herein are prepared by the method which has been previously related. That is, one simply reacts the appropriate disilane with the appropriate butadiene at the stated temperatures thereafter recovering the silacyclopentene.

This invention further relates to disiloxanes of the formula

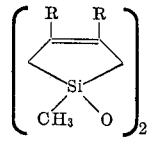

in which R is selected from the group consisting of hydrogen atoms and alkyl radicals containing from 1 to 6 carbon atoms inclusive.

The disiloxanes depicted above are prepared by merely taking the silacyclopentene which has a functional group (the alkoxy radical and/or the halogen atom) attached to the silicon atom and conventionally hydrolyzing it by known techniques. For example, one simply adds the functional silacyclopentene to a buffered (neutral) aqueous system at ambient temperatures and thereafter recovers the disiloxane.

This invention still further relates to copolymers consisting of
(A) units of the formula

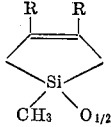

R is selected from the group consisting of hydrogen atoms and alkyl radicals containing from 1 to 6 carbon atoms, and (B) units of the formula $$R'''_n SiO_{\frac{4-n}{2}}$$

R''' is a hydrocarbon radical or halohydrocarbon radical, and $n$ has a value of from 0 to 3 inclusive, there being at least one (A) unit per molecule on the average.

R''' can be any hydrocarbon radical or halohydrocarbon radical such as the methyl, ethyl, propyl, isopropyl, butyl, isobutyl, t-butyl, amyl, hexyl, decyl, cyclohexyl, cyclopentyl, phenyl, xenyl, naphthyl, tolyl, xylyl, vinyl, allyl, cyclohexenyl, choromethyl, bromophenyl, tetrafluoroethyl, trifluorovinyl, trifluorotolyl, hexafluoroxylyl, heptachloroxenyl, heptafluoropropyl, chlorodifluorovinyl, and the 3,3,3-trifluoropropyl radical among many others.

The copolymers are best prepared by methods which are well known to the art. For example, one simply heats a mixture of the disiloxanes noted herein with a compound corresponding to the unit Formula B illustrated above in the presence of a bond-rearranging catalyst such as KOH, silanolates, and the like. The mixture is then neutralized, filtered, and stripped whereupon the resulting copolymer is isolated.

The following examples are merely illustrative and are not intended to limit the invention which is properly delineated in the appended claims.

EXAMPLE 1

A mixture of 6.0 grams of $(CH_3)_4Si_2(OCH_3)_2$ and 5.52 grams of $CH_2=CCH_3-CCH_3=CH_2$ was sealed in an ampoule and heated at a temperature of 225° C. for 18 hours. Distillation provided a silacyclopentene (14.7% yield) of the formula

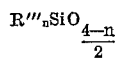

having a B.P. of 72° C./68 mm. Structure was confirmed by infrared, n.m.r. and mass spectral comparison with a known sample. The other product was $Me_2Si(OCH_2)_2$.

The above reactants were passed through a 2.5 x 62 cm. quartz tube (5–6 ml./hr.) and heated to 400° C. In this case, an 80% yield of the silacyclopentene was obtained.

EXAMPLE 2

A mixture of 17.8 grams of $(CH_3)_4Si_2(OCH_3)_2$ and 10.2 grams of $CH_2=CCH_3-CH=CH_2$ was passed through a 2.5 x 62 cm. quartz tube at a rate of 5–6 ml./hr. at a temperature of 400° C. Distillation provided a silacyclopentene (75% yield) of the formula

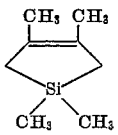

having a B.P. of 123–124° C. The structure was confirmed by infrared, n.m.r., and mass spectral comparison with a known sample.

EXAMPLE 3

A mixture of 40.0 grams of $(CH_3)_2Si_2(OCH_3)_4$ and 23.4 grams of $CH_2=CCH_3-CCH_3=CH_2$ was passed through a quartz tube at a rate of 5–6 ml./hr. and at a temperature of 400° C. Distillation provided a silacyclopentene (25% yield) of the formula

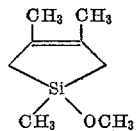

having a B.P. of 158–159° C. The structure was confirmed by infrared, n.m.r., mass spectral, and elemental analyses.

EXAMPLE 4

A mixture of 80% $(CH_3)_2Si_2(Cl)_4$ and 20%

$$(CH_3)_3Si_2(Cl)_3$$

was reacted with $CH_2=CH-CH=CH_2$ at 550° C. by adding 810.5 grams of the methylchlorodisilanes (0.06 mol/hr.) and butadiene (0.18 mol/hr.). Distillation of the pyrolyzate provided an 82% yield of a 10:1 mixture of silacyclopentenes of the formulae

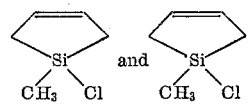

The structures were confirmed by infrared, n.m.r., mass spectral, and elemental analyses.

EXAMPLE 5

A sample of pure $(CH_3)_3Si_2(Cl_3)$ was passed through a quartz tube (550° C.) at a rate of 0.06 mol/hr. in the presence of $CH_2=CH-CH=CH_2$ (0.18 mol/hr.). Distillation provided a mixture of silacyclopentenes of the formulae

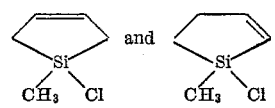

EXAMPLE 6

$Si_2Cl_6$ was passed through a quartz tube (500° C.) at a rate of 0.06 mol/hr. in the presence of butadiene (0.18 mol/hr.). Distillation of the pyrolyzate provided a silacyclopentene (75% yield) of the formula

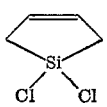

The structure was confirmed by infrared, n.m.r., mass spectral and elemental analyses.

EXAMPLE 7

$(CH_3)_3Si_2(F)_3$ was passed through a quartz tube (550° C.) at a rate of 0.06 mol/hr. in the presence of butadiene (0.18 mol/hr.). Distillation of the pyrolyzate provided a 50% yield of a mixture of silacyclopentenes of the formulae

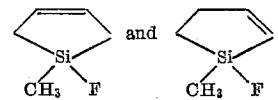

The structures were confirmed by infrared, n.m.r., and mass spectral analyses.

EXAMPLE 8

When $CH_2=CH-CC_6H_{13}=CH_2$ was substituted for the corresponding compound of Example 1, a silacyclopentene of the formula

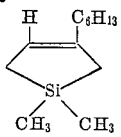

was obtained.

EXAMPLE 9

100 grams of

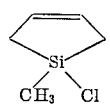

was hydrolyzed in a mixture of 500 grams of water and 70 grams of $NaHCO_3$. Distillation provided a disiloxane of the formula

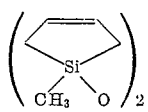

having a B.P. of 105° C./125 mm. The structure was confirmed by infrared, n.m.r., mass spectral and elemental analyses.

EXAMPLE 10

A mixture of 1000 grams of dimethylpolysiloxane (mixed cyclics), 5.6 grams of a disiloxane of the formula

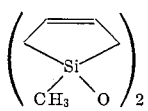

and 1.7 grams of KOH was heated to 150° C. for 3 hours. The resulting fluid was neutralized, filtered and stripped to 260° C./0.4 mm. A fluid (75% yield) of the formula

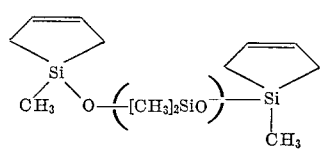

having a viscosity of 11,800 cs. at 25° C. was obtained.

It was noted that the silacyclopentene ring system, when used as an endblocking group, provides good crosslinking and chain extension in polymer systems and in such applications is apparently more active than the currently used vinylsilanes.

EXAMPLE 11

When the following reactants are substituted for the corresponding reactant of Example 10, the products noted below are obtained.

(A) Trifluoropropylmethyl cyclics

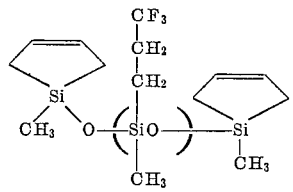

(B) Phenylmethyl cyclics

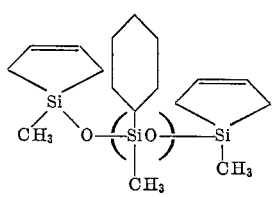

(C) Vinylmethyl cyclics

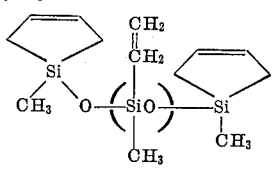

EXAMPLE 12

When a toluene solution of a copolymer of the formula

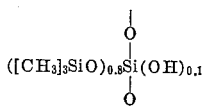

is refluxed with a silacyclopentene of the formula

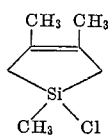

a compound of the formula

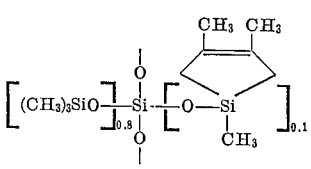

is obtained.

That which is claimed is:

1. A method for making silacyclopentenes comprising
   (A) heating to a temperature o ffrom 50° C. to 600° C.,
      (1) a disilane of the formula $R'_{6-n}Si_2X_n$, in which
         R' is selected from the group consisting of methyl radicals, alkoxy radicals, and halogen atoms selected from the group consisting of a chlorine atom, a bromine atom, an iodine atom, and a fluorine atom,
         X is selected from the group consisting of an alkoxy radical and a halogen atom selected from the group consisting of a chlorine atom, a bromine atom, an iodine atom, and a bromine atom,
         $n$ has a value of from 1 to 6 inclusive, with
      (2) a butadiene of the formula $$H_2C=CR-CR=CH_2$$

in which
         R is selected from the group consisting of hydrogen atoms and alkyl radicals containing from 1 to 6 carbon atoms inclusive, thereafter
   (B) recovering silacyclopentenes of the formulae

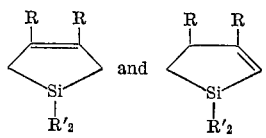

in which
      R is selected from the group consisting of hydrogen atoms and alkyl radicals of from 1 to 6 carbon atoms inclusive, and
      R' is selected from the group consisting of methyl radicals, alkoxy radicals, and halogen atoms selected from the group consisting of a chlorine atom, a bromine atom, an iodine atom, and a fluorine atom.

2. The process as recited in claim 1 in which the temperature is within the range from 400° C. to 550° C.

3. A silacyclopentene of the formula

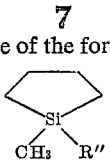

in which
R″ is a halogen atom selected from the group consisting of a chlorine atom, a bromine atom, an iodine atom, and a fluorine atom.

4. A silacyclopentene as recited in claim 3 in which R″ is a chlorine atom.

5. A silacyclopentene as recited in claim 3 in which R″ is a fluorine atom.

6. A silacyclopentene of the formula

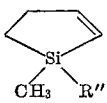

in which
R″ is a halogen atom selected from the group consisting of a chlorine atom, a bromine atom, an iodine atom, and a fluorine atom.

7. A silacyclopentene as recited in claim 6 in which R″ is a chlorine atom.

8. A silacyclopentene as recited in claim 6 in which R″ is a fluorine atom.

9. A disiloxane of the formula

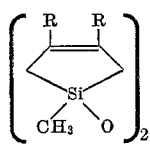

in which
R is selected from the group consisting of a hydrogen atom and an alkyl radical containing from 1 to 6 carbon atoms inclusive.

10. A disiloxane as recited in claim 9 in which each R is a hydrogen atom.

11. A disiloxane as recited in claim 9 in which each R is a methyl radical.

12. A disiloxane as recited in claim 9 in which one R is a hydrogen atom and one R is a methyl radical.

13. Copolymers consisting of
(A) at least one unit of the formula

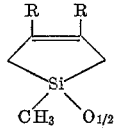

in which
R is selected from the group consisting of hydrogen atoms and alkyl radicals containing from 1 to 6 carbon atoms inclusive, and
(B) units of the formula

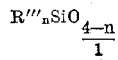

in which
R‴ is a monovalent hydrocarbon radical or monovalent halohydrocarbon radical, and
n has a value of from 0 to 3 inclusive.

14. A copolymer as recited in claim 13 in which R is a hydrogen atom, R‴ is a methyl radical, and n is an integer of 2.

References Cited

UNITED STATES PATENTS 3,398,178   8/1968   Nelson.

TOBIAS E. LEVOW, Primary Examiner

P. F. SHAVER, Assistant Examiner

U.S. Cl. X.R.

260—37, 46.5, 448.8